United States Patent [19]

Georgia et al.

[11] 4,031,937

[45] June 28, 1977

[54] UNITARY TIRE-WHEEL

[75] Inventors: Edward J. Georgia, Los Altos, Calif.; Russell K. H. Eggers, Baltimore; Ernest L. Molnar, Timonium, both of Md.

[73] Assignee: Zedron, Inc., Baltimore, Md.

[22] Filed: June 2, 1975

[21] Appl. No.: 582,624

[52] U.S. Cl. .................................. 152/9; 152/56; 152/323

[51] Int. Cl.² .............................................. B60B 9/22

[58] Field of Search .......... 152/323, 327, 330, 328, 152/329, 378 R, 378 W, 379, 9, 56; 301/63 PW

[56] References Cited

UNITED STATES PATENTS

| 539,586 | 5/1895 | Long | 152/379 R |
|---|---|---|---|
| 573,671 | 11/1896 | Leigh | 152/378 R |
| 1,258,573 | 3/1918 | Johnstone | 152/328 X |
| 2,231,745 | 2/1941 | Altmyer | 152/9 |
| 2,584,073 | 1/1952 | Williams | 152/329 |
| 3,062,254 | 11/1962 | Keefe | 152/323 |
| 3,329,192 | 7/1967 | Roque | 152/327 |
| 3,470,933 | 10/1969 | Molnar | 152/330 |
| 3,843,202 | 10/1974 | Lacerte | 301/63 PW |

*Primary Examiner*—Drayton E. Hoffman
*Assistant Examiner*—John P. Shannon
*Attorney, Agent, or Firm*—Beveridge, DeGrandi, Kline & Lunsford

[57] ABSTRACT

A pneumatic or semi-pneumatic unitary tire-wheel comprising a completely enclosed toroidal chamber bonded around a coaxial inner sleeve. A plurality of tie members are integral with and extend between the sidewalls to restrict lateral deformation thereof. Such reinforcing tie members may be hollow to give the appearance of openings between wheel spokes.

6 Claims, 6 Drawing Figures

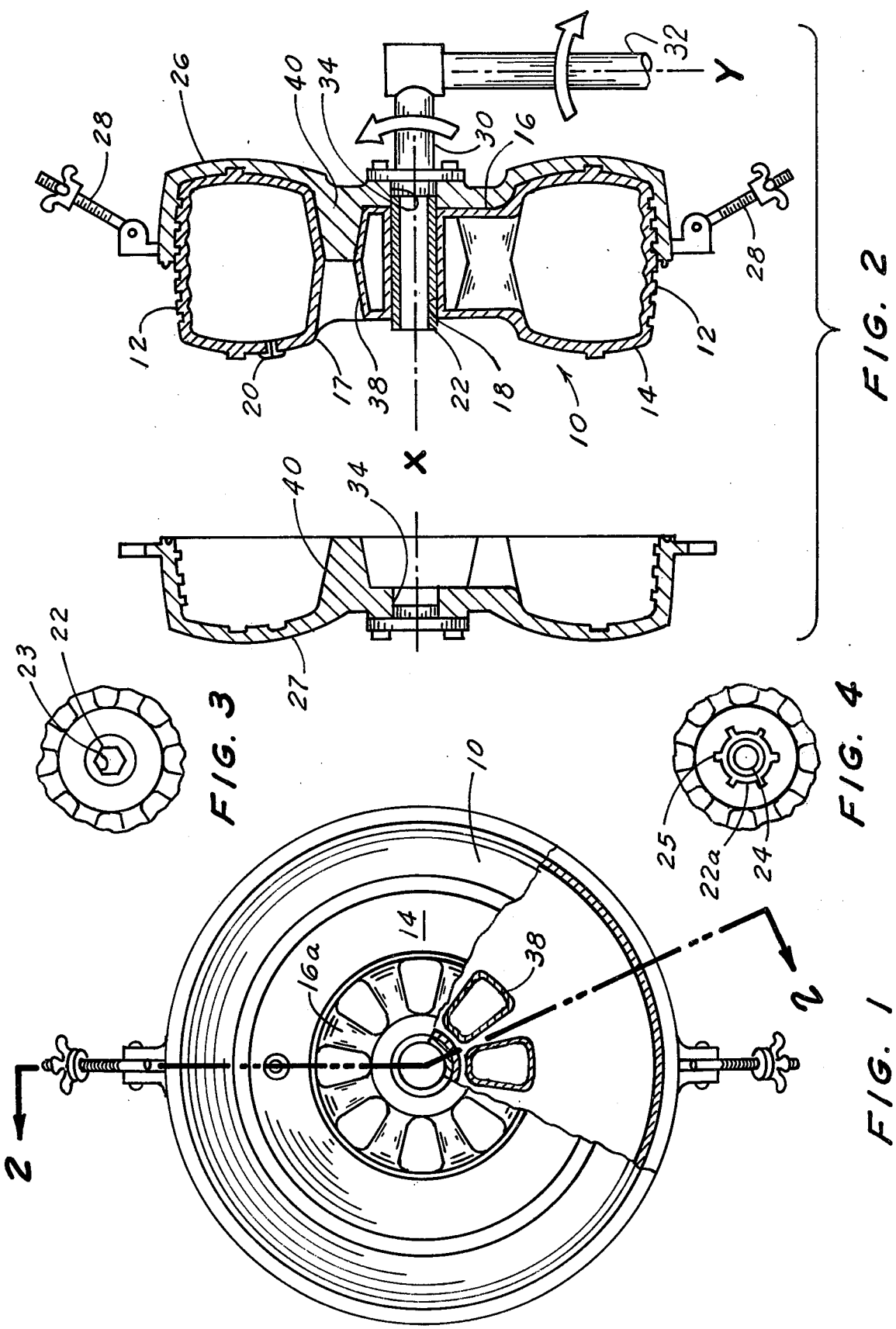

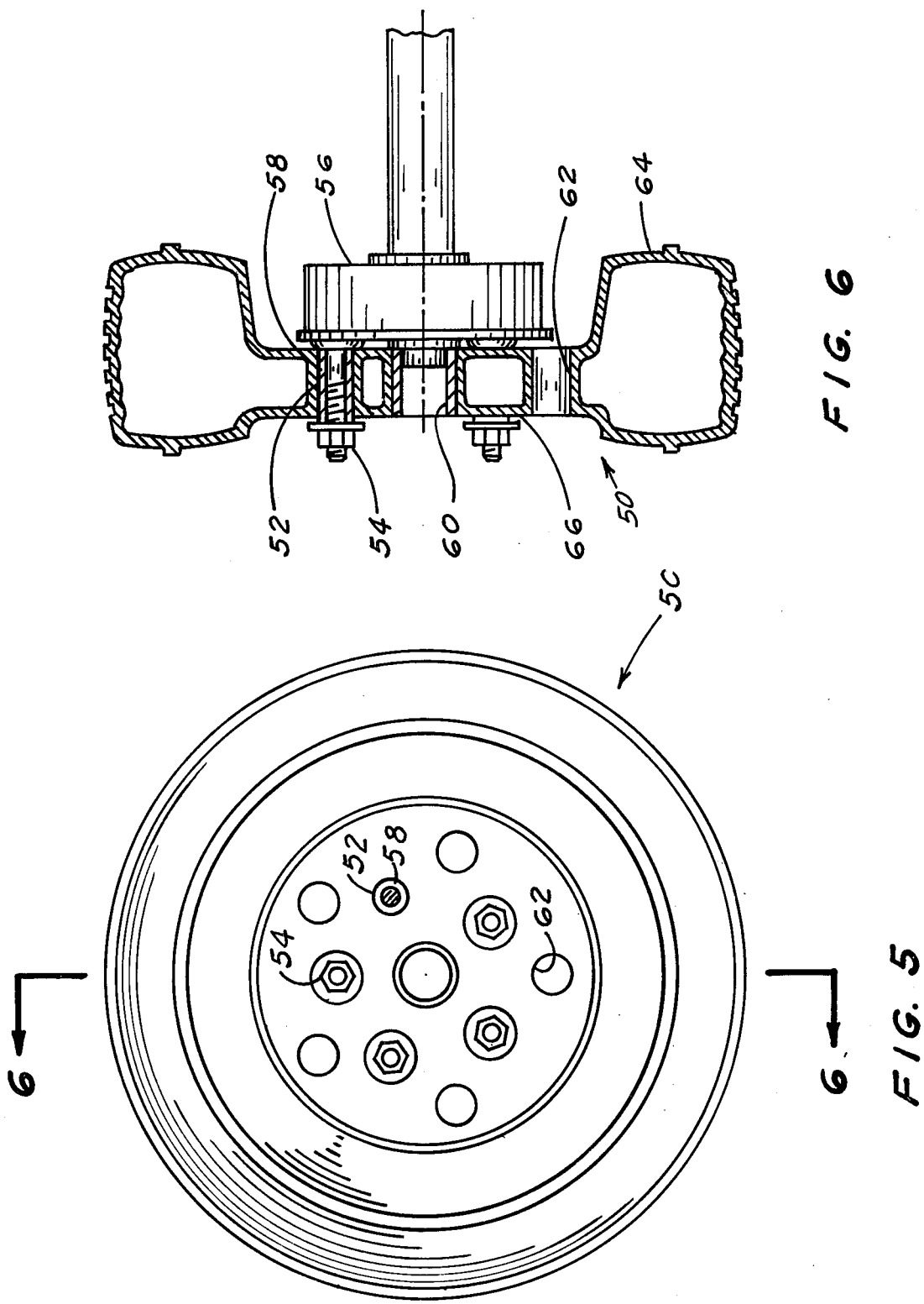

UNITARY TIRE-WHEEL

BACKGROUND OF THE INVENTION

Generally, manufacturers of vehicles are required to purchase wheels from one supplier and tires from another supplier, or at best, one supplier or the other has to subcontract for the other component. Moreover, it is often necessary that either the tire or the wheel be manufactured to specifications to insure compatibility of the two components. In any event, purchasing costs, including higher freight costs, are maximized to the vehicle manufacturer, and hence, to his customers. In addition, the equipment manufacturer must include the costs of mounting the tires on the wheel in his overall manufacturing costs. It is obviously desirable to reduce the number of suppliers and to be able to procure a total assembly at less than the sum of the separate unit costs.

Further disadvantages of the conventional tire and wheel assembly reside in the occurrence of rim slippage, which reduces vehicle operation efficiency. Moreover, in some instances the excessive weight of a conventional wheel may be a significant factor, the alleviation of which would be a desirable end.

Others have recognized the advantage of providing a one-piece tire-wheel which is mounted on a central hub to be carried directly on the shaft of a vehicle. However, such tire-wheels are generally restricted to very small wheels, as for example, toys, children's carts, skates, and the like, and are often made fairly rigid to support loads without inflation. Where pneumatic tires are desirable, as on a vehicle driven by a human operator, considerable difficulty has been experienced in maintaining an air-tight enclosure where the tire is secured mechanically to a central hub. Difficulty has also been experienced in effecting a firm bond between the tire-wheel and the hub. In addition, when a one-piece tire-wheel extending from hub to crown, is inflated, there is a tendency for the tire to balloon excessively in lateral directions. This is particularly significant where there is a need to maintain dimensional stability in the tire-wheel assembly to avoid interference with other parts of the vehicle.

OBJECTS OF THE INVENTION

It is an object of this invention to provide a unitary tire-wheel wherein a complete, toroidal envelope is molded directly to a central, coaxial hub.

It is a further object of this invention to provide a pneumatic or semi-pneumatic unitary tire-wheel of minimum weight with maximum strength and performance capabilities.

It is a further object of this invention to provide a unitary tire-wheel capable of supporting vehicle loads and transmitting torque from hub to crown.

It is a further object of this invention to provide a tire-wheel having reinforcing means outward of the hub.

It is a further object of this invention to provide a unitary tire-wheel which may be inflated for load bearing properties, flotation and riding comfort.

It is a further object of this invention to form an integral tire-wheel to simulate the appearance of a conventional tire and wheel assembly.

It is a further object of this invention to provide a tire-wheel having means to restrict lateral deformation of the sidewalls.

Other objects and advantages of this invention will become apparent from the description to follow when read in conjunction with the drawings appended hereto.

BRIEF SUMMARY OF THE INVENTION

In carrying out this invention, the unitary tire-wheel is molded or cast of a suitable polymer material and is formed as a complete, air-tight envelope molded directly around a central hub. An adhesive may be applied to the central hub prior to casting to enhance the bond between the hub and the polymer to be built-up around it during the casting process. A plurality of tubular tie bars are formed integral with the sidewalls to extend between them to act as structural reinforcing members and to restrict the lateral deformation of the sidewalls. The tie members are formed by extending bars of a desired cross-sectional configuration from one side of the mold to the other, whereby the polymer will build up around the bars during the casting process to form hollow, structural reinforcing tie bars integral with the sidewalls. Viewed from the side, the interior of the hollow tie bars appear as spaces between imperforate wheel portions which thereby appear as spokes.

BRIEF DESCRIPTION OF THE DRAWINGS

In the drawings:

FIG. 1 is an elevation view, partially broken of a tire in place in a mold section, the tire being manufactured in accordance with this invention;

FIG. 2 is a section view taken along line 2—2 of FIG. 1;

FIGS. 3 and 4 are partial end views of hub embodiments;

FIG. 5 is an elevation view of another tire embodiment; and

FIG. 6 is a section view taken along 6—6 of FIG. 5.

DESCRIPTION OF PREFERRED EMBODIMENTS

The Embodiment of FIGS. 1 and 2

Referring now to FIGS. 1 and 2 with greater particularity, the unitary tire-wheel 10 of this invention is preferably molded or cast from any suitable polymer material. By whatever, material, the tire-wheel is formed as a complete, air-tight envelope with a radially outer wall or crown portion 12, generally parallel, annular sidewall members 14 separated by approximately the width of the crown portion 12, inner sidewall member 16 which are stepped inward at 17 from the outer side wall members 14 to effect a visual interruption and simulate a wheel, and an inner cylindrical wall 18. An inflation valve 20 may be carried in some portions of the sidewall whereby the entire tire-wheel structure, from crown portion to inner wall, may be inflated to a uniform pressure if desired.

In manufacture, as will be described, the inner wall 18 is molded around a coaxial, inner sleeve 11 of fairly rigid material, preferably a suitable metal. Such sleeve is rigidly secured to the inner wall 18 of the unitary tire-wheel, as by means of a compatible polymer to metal adhesive, to supplement the bond achieved during the casting process. The resultant firm bond enables the transmission of torque from the inner sleeve 22 through the tire-wheel 10. The inner sleeve 22 may be formed with a hexagonal or otherwise non-circular inner surface 23 as shown in FIG. 3 to enable the tire-wheel 10 to function as a drive wheel and transmit torque from a complementary engaging (not shown) drive shaft received therein. Otherwise, the sleeve may subsequently be fitted with a suitable anti-friction bearing 24, as shown in FIG. 4, to improve the rotational characteristics thereof. In addition, the sleeve 22a may have radial projections 25 or other irregularities on the outer surface thereof to provide a mechanical, as well as an adhesive, interlock with the unitary tire-wheel.

The tire-wheel of this invention may be formed by any suitable means, such as by blow molding or by rotational casting, as illustrated in U.S. Pat. No. 3,470,933 granted Oct. 7, 1969 to E. L. Molnar. If rotationally cast, as described in the Molnar patent, a quantity of a suitable polymer is placed within a mold section 26 and the complementary section 27 of the mold is clamped thereto by any suitable means such as the bolting arrangement 28 shown. Then the mold is rotated about two axes while under heat to distribute and build up the polymer over the exposed inner surfaces of the mold. This is shown schematically in FIG. 1, where the mold is revolved about its own axis $x$ on the shaft 30 and is rotated on the shaft 32 about an axis $y$ parallel to a diameter of the tire-wheel 10. By whatever casting method, blow molding, rotational casting or any other method, the polymer is placed inside the mold and caused to form against and around all exposed inner surfaces thereof.

A central, coaxial opening 34 is provided in each mold section 26, 27 of a size to receive the central coaxial sleeve 22, whereby the sleeve is gripped therein at opposite ends to extend between the recesses 34 in the mold sections 26, 27 during the casting operation. Prior to initiating the casting operation, an adhesive is applied over the outer surface of the metal sleeve 22 to greatly increase the bond between the inner wall 18 of the tire-wheel 10 and the outer surface of the sleeve. A chemical and mechanical bond is created when heat is applied while molding the tire-wheel 10. Then, as shown in FIG. 2 when the mold sections 26 and 27 are separated, the sleeve is released by them to remain with the tire-wheel 10 and become an integral part thereof.

A particular feature of this invention resides in the provision of a plurality of tubular tie bars 38 which extend from sidewall 14, 16 to sidewall and are formed integral therewith. The tie bars 38 function as structural reinforcing members for the tire-wheel 10 and further restrict outward deformation of the sidewalls when the unitary tire-wheel 10 is inflated. The tie bars 39 are tubular in configuration, but may be of almost any selected cross-sectional shape. For example, as shown in FIGS. 1 and 2, the tie bars 39 may be of generally trapezoidal configuration, providing an open trapezoidal space with spoke-like members 16a formed by the sidewall positions 16 therebetween, thus simulating the general configuration of a vehicle wheel. However, the tie may be circular or of any other desired configuration. The tie bar forms 40 may be in two sections, each being fixed to a mold section 26 and 27, whereby when the mold is assembled, the tie bar forming sections 40 abut at their leading edges to form a complete tie bar form, spanning the tire mold 26, 27. The form sections 40 are preferably tapered toward the center of the mold 26, 27 to facilitate removal of the forms from within the tie bars 38 molded around them during the casting process. The polymer is plasticized during molding and caused to form around the surface of the tie bar mold, sections 26, 27 to form with the walls 12, 14, 16 and 18, air-tight toroidal enclosure with integral tubular structural reinforcing members 38 extending between the sidewalls 16 of the tire-wheel. When the mold halves 26, 27 are separated after completion of the casting process, the tie bar molds 40 are withdrawn from the wheel to leave the tie bars 38 spaced around the wheel for reinforcing purposes.

The Embodiment of FIGS. 5 and 6

Referring now to FIGS. 5 and 6, there is shown a unitary tire-wheel 50 wherein certain tie bar members 52 are of circular cross-section and are disposed to conform to the spacing of bolts 54 on the bolt circle of a conventional studded axle flange 56. Hence, the tire-wheel 50 may be mounted directly on the studded axle flange to rotate therewith or to be driven thereby. If desired, suitable metallic bearing members 58 may be secured within the tie bar 52 openings to improve the wear characteristic of the bolt hole tie bars 52. Such bearing members 58 may be molded into the tire, as in the case of the inner coaxial sleeve 60, or they may be bonded into the tie member openings after casting is completed.

In addition, a second series of tie bar tubes 62 may be provided outward of the bolt circle for further structural reinforcing purposes, and to restrict lateral deformation out toward the tire portion 64. The tie bar tubes 62 may be circular in configuration, as shown, or of any other desired geometrical shape. As shown, the wheel portion 66 of the unitary tire-wheel may be offset axially with respect to the tire portion 64 for overall balance and necessary clearances.

While this invention has been described in conjunction with preferred embodiments thereof, it is obvious that modifications and changes therein may be made by those skilled in the art without departing from the spirit and scope of this invention as defined by the claims appended hereto. 9n

What is claimed as invention is:

1. A one-piece inflatable tire-wheel having a pneumatic tire portion including a crown portion and a pair of spaced apart sidewalls which cooperatively define a toroidal air chamber coextendant thereabout, a wheel portion including a central hub and a pair of spaced apart sidewalls, each of said sidewalls of said wheel portion being integral with one of said sidewalls of said tire portion and extending therefrom to said central hub and being integral with said central hub, said sidewalls of said wheel portion defining a continuous air chamber therewithin and interconnecting said central hub and said pneumatic tire portion as a unitary one-piece tire-wheel, said air chamber of said tire portion opening into said air chamber of said wheel portion and providing unitary and continuous inflatable air chamber means within said tire-wheel for receiving pneumatic pressurization in maintaining the structural integrity of said tire-wheel to provide a pneumatically sustained tire-wheel, said wheel portion including a plurality of hollow structural reinforcing tie members disposed intermediate said central hub and said pneumatic tire portion, said tie members including wall portions integral with and extending between said sidewalls of said wheel portion in a manner to restrict lateral deformation thereof, and valve means for inflation of said air chamber means of said inflatable tire-wheel to the desired pneumatic pressure.

2. The tire member defined by claim 1 wherein:
said tie members are tubular.

3. The tire member defined by claim 1 wherein:

said tie members are tubular and disposed to coincide with the bolting on a vehicle hub.

4. The tire member defined by claim 1 wherein:
said tie members are tubular and are configurated and disposed so that the inner side wall portions between them appear as wheel spokes.

5. A one-piece inflatable tire-wheel as specified in claim 1 wherein said side walls of said pneumatic tire portion are spaced apart substantially the width of said tread portion and said sidewalls of said wheel portion are more closely positioned together than said sidewalls of said tire portion in simulation of a wheel.

6. A one-piece, molded, inflatable tire-wheel having a pneumatic tire portion including a crown portion and a pair of spaced apart sidewalls which cooperatively define a toroidal air chamber coextendant thereabout, a wheel portion comprising a hub for said tire portion, said wheel portion including a pair of spaced apart sidewalls, each of said sidewalls of said wheel portion being integral with one of said sidewalls of said tire portion, said sidewalls of said wheel portion defining a continuous air chamber within said wheel portion and interconnecting said tire portion and wheel portion as a unitary one-piece tire-wheel, and a plurality of hollow structural reinforcing tie members spaced apart within said wheel portion, each said tie members including wall portions integral with and extending between said sidewalls of said wheel portion in a manner to restrict lateral deformation thereof, said air chamber of said tire portion opening into said air chamber of said wheel portion and providing unitary and continuous inflatable air chamber means within said tire wheel for receiving pneumatic pressurization in maintaining the structural integrity of said tire-wheel to provide a pneumatically sustained tire-wheel, means for interconnection of said tire wheel to an axle means, and valve means for inflation of said air chamber means of said inflatable tire-wheel to the desired pneumatic pressure.

* * * * *